(12) United States Patent
Prashanth

(10) Patent No.: US 7,894,608 B2
(45) Date of Patent: *Feb. 22, 2011

(54) SECURE APPROACH TO SEND DATA FROM ONE SYSTEM TO ANOTHER

(75) Inventor: Devi Prashanth, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/185,412

(22) Filed: Aug. 4, 2008

(65) Prior Publication Data

US 2010/0005307 A1 Jan. 7, 2010

Related U.S. Application Data

(63) Continuation of application No. 10/226,491, filed on Aug. 21, 2002, now Pat. No. 7,436,966.

(51) Int. Cl.
*H04L 9/00* (2006.01)

(52) U.S. Cl. .................... 380/285; 380/44; 380/29; 713/168; 713/181

(58) Field of Classification Search ............. 380/283, 380/285
See application file for complete search history.

(56) References Cited

U.S. PATENT DOCUMENTS

| 4,200,770 A | 4/1980 | Hellman et al. |
| 4,218,582 A | 8/1980 | Hellman et al. |
| 4,405,829 A | 9/1983 | Rivest et al. |
| 5,227,613 A * | 7/1993 | Takagi et al. ................ 235/380 |
| 6,792,532 B1 | 9/2004 | Lee et al. |

FOREIGN PATENT DOCUMENTS

EP 1063813 A2 12/2000

OTHER PUBLICATIONS

Schneier; Applied Cryptography, 1996, John Wiley & Sons; pp. 28-29, 38, 173, 367, 516-517.*
Notice of Allowance (Mail Date Apr. 14, 2010) for U.S. Appl. No. 12/185,364, filed Aug. 4, 2008; Confirmation No. 9222.
Schneier; Applied Cryptography, 1996, Wiley, 2nd Edition; pp. 38, 173, 367.
Schneier; Applied Cryptography, 1996, Wiley, 2nd Edition; pp. 14, 15, 38, 40, 358, 513.

* cited by examiner

*Primary Examiner*—Kimyen Vu
*Assistant Examiner*—Yogesh Paliwal
(74) *Attorney, Agent, or Firm*—Schmeiser, Olson & Watts; John Pivnichny

(57) ABSTRACT

A secure approach for sending a original message from a sender to a receiver. The sender may encrypt the original message by performing an XOR (or XNOR) operation of the original message and a first random message (same size as original message) on a bit by basis to generate a second message. The receiver may also perform an XOR of the second message with a locally generated second random message. The resulting message is sent to the sender system. The sender system may again perform XOR operation of the received message and the first random message, and send the resulting message to receiver. The receiver may perform XOR operation on the received output to generate the original message sent by the sender. Other technologies such as digital signatures and key pairs (public key infrastructure) may be used in each communication between the sender and receiver to further enhance security.

20 Claims, 6 Drawing Sheets

SECURE APPROACH TO SEND DATA FROM ONE SYSTEM TO ANOTHER

This application is a continuation application claiming priority to Ser. No. 10/226,491, filed Aug. 21, 2002.

BACKGROUND OF THE INVENTION

1. Field of the Invention

The present invention relates to information security, and more specifically to a method and apparatus to securely send data from one system to another.

2. Related Art

It is often required to send data ("original message") from one system ("sender system") to another ("receiver system"). One typical concern while sending messages over any medium (Internet, etc.) is that an unknown third party ("intruder") may decipher the original messages when in transit between the two systems. In addition, the intruder may also modify the original messages and then deliver the modified messages to the receiver system. Accordingly, it is often desirable to send the original messages in a secure manner which addresses one or more of such concerns as is well known in the relevant arts.

One approach for securely sending messages is by using a key ("shared key"), which is shared by both a sender system and a receiver system. In a typical scenario, a sender system encrypts a original message using the shared key to generate an encrypted message. The sender system sends the encrypted message to the receiver system. The receiver system then decrypts the message using the shared key to recover the original message.

One problem with the above approach is that a shared key needs to be sent to at least one of the two systems to facilitate sharing of a generated key. Unfortunately, an intruder may have access to the key while the key is being thus sent, and the security may be thereafter compromised. In addition, each pair of sender system and receiver system may need to have a different shared key to ensure that third parties cannot easily decipher the underlying message. As a result, the corresponding solutions may not scale to situations in which a large of number of senders and receivers are present.

One solution to the above problem is by using a pair of keys ("key pair") at least for a receiver system. The key pair generally contains a private key and a public key generated according to a mathematical approach such that a message encrypted with a public key can be decrypted using the corresponding private key. The public key may be provided to any of the sender systems, and the private key is maintained confidential at the receiver system.

When sending a message, the sender system encrypts the message using the public key of the receiver. On receiving the message, the receiver decrypts the encrypted message using the private key and thus recovers the original message. As the private key need not be sent to any of the sender systems, the probability of maintaining private key confidential is greatly enhanced. In addition, as the public key can be shared with any number of sender systems, the approach generally scales to a large number of sender and receiver systems.

U.S. Pat. No. 4,218,582 entitled, "Public key cryptographic apparatus and method", issued to Hellman et al (hereafter "582 patent") discloses example embodiments of such a system using a combination of public and private key. U.S. Pat. No. 4,405,829 entitled, "Cryptographic communications system and method" issued to Rivest et al also discloses systems for communication using public keys.

However, even in the key pair based approaches, the level of security is generally proportional to the length (or two power the length) of the private keys. However, with a large number of computations, an intruder may use several values as private keys until a correct private key causes the encrypted message to be deciphered.

Accordingly, there have been attempts to increase the length of the (private) keys (to 128 bits or higher) to make the level of security generally higher. However, with availability of greater computational power in a cost-effective manner, the longer keys also may not be adequate to satisfy the security needs of at least some applications.

Several other attempts are also well known to address some of the problems noted above. For example, U.S. Pat. No. 4,200,770, issued to Hellman et al (hereafter "770 patent") discloses a cryptographic system which transmits a computationally secure cryptogram over an insecure communication channel without prearrangement of a cipher key. The 770 patent discloses that a secure cipher key is generated by the conversers from transformations of exchanged transformed signals. The conversers each possess a secret signal and exchange an initial transformation of the secret signal with the other converser. The received transformation of the other converser's secret signal is again transformed with the receiving converser's secret signal to generate a secure cipher key.

The system of the 770 patent thus appears to require exchange of a secret signal, which in turn is used to generate a secure cipher key. Such a overhead of having to exchange the secret signal may be unacceptable at least in some environments. What is therefore needed is a method and apparatus to deliver messages securely from one system to another.

SUMMARY OF THE INVENTION

The present invention allows an original message to be sent from a sender system ("sender") to a receiver system ("receiver") in a sec ure manner. In an embodiment, a computational logic is selected in both the sender and receiver such that an original message is regenerated when the computation logic is performed on the original message multiple times, with an output of the computation logic of one time being used as an input to the computation logic next time.

In operation, a sender may perform a computational logic on an original message to encrypt the original message and to generate a second message. The second message is sent to a receiver. The receiver in turn may perform another computational logic on the second message to generate a third message. The third message is sent the sender. The sender performs the computational logic on the third message, and sends the resulting fourth message to the receiver. The receiver generates (recovers) the original message by performing the computational logic on the fourth message.

The computational logic may need to be associative and commutative. In one implementation, the computational logic is implemented as either an XOR or XNOR operation, with the operation being performed on a bit-by-bit basis with a random message of the same size as the original message. The random messages may be generated locally in each of the sender and receiver.

From the above, it may be appreciated that embodiments according to an aspect of the present invention can be implemented without having to exchange any secret keys or key pairs to send a message in a secure manner. However, security may be further enhanced by using digital signatures, key pairs, digital certificates and/or message digests as described below.

In an embodiment, the message generated by applying the computational logic is first encrypted using the public key of the other system to generate an encrypted message. A message digest is generated by applying a one way hashing algorithm on the encrypted message. A digital signature is then generated by encrypting the message digest using the private key of the system sending the encrypted message. The digital signature and the encrypted message are sent to the other system.

The other system may first decrypt the digital signature using the public key of the sending system to recover the message digest generated at the sending system. A new message digest may be generated by applying the one-way hash on the encrypted message. If the new message is identical to the decrypted message digest, the other system may determine the encrypted message has in fact not been modified by an unknown third party. The received encrypted message is decrypted using the private key of the other system, and the computational logic is then applied on the decrypted message.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A sender system according to an aspect of the present invention may use a computational logic to encrypt an original message (causing a "second message" to be generated). The computational logic may be chosen such that when performed on a given message multiple times, the given message is generated again. A receiver system may also use a computational logic to encrypt the second message again, and send back the resulting third message to the sender system.

The sender system applies the computational logic on the third message to generate a fourth message and sends it to the receiver system. Receiver system applies computational logic on the fourth message to generate a fifth message. The sending and receiving sequences may be continued until the choice of computational logic would cause the original message to be generated at the receiver system. In one embodiment described below, an XOR operation is chosen for the computational logic such that the computational logic is applied twice at each of the sender system and the receiver system while sending an original message.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
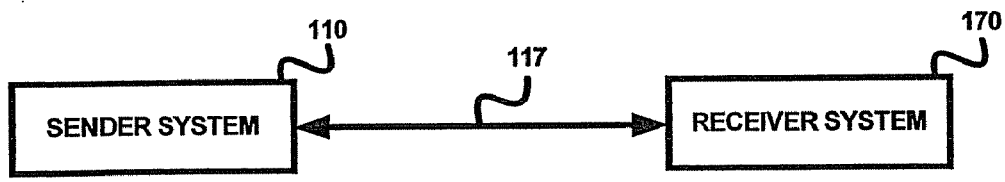
FIG. 1 is a block diagram illustrating an example environment in which the present invention may be implemented.

FIG. 1 is a block diagram illustrating an example environment in which the present invention can be implemented. There are shown sender system 110 and receiver system 170 connected by communication path 117. Each component is described in further detail below.

Communication path 117 represents any technology/medium providing connectivity between sender system 110 and receiver system 170. Examples of communication path 117 include Internet, dial-up connection using modems, etc. Communication path 117 may be implemented in a known way.

Sender system 110 may need to send messages ("original message") to receiver system 170 on communication path 117. It may be required to send the message to receiver system 170 securely. The manner in which an original message may be sent by sender system 110 to receiver system 170 securely is described below with reference to FIG. 2.

3. Sending Messages Securely

Figure 2:
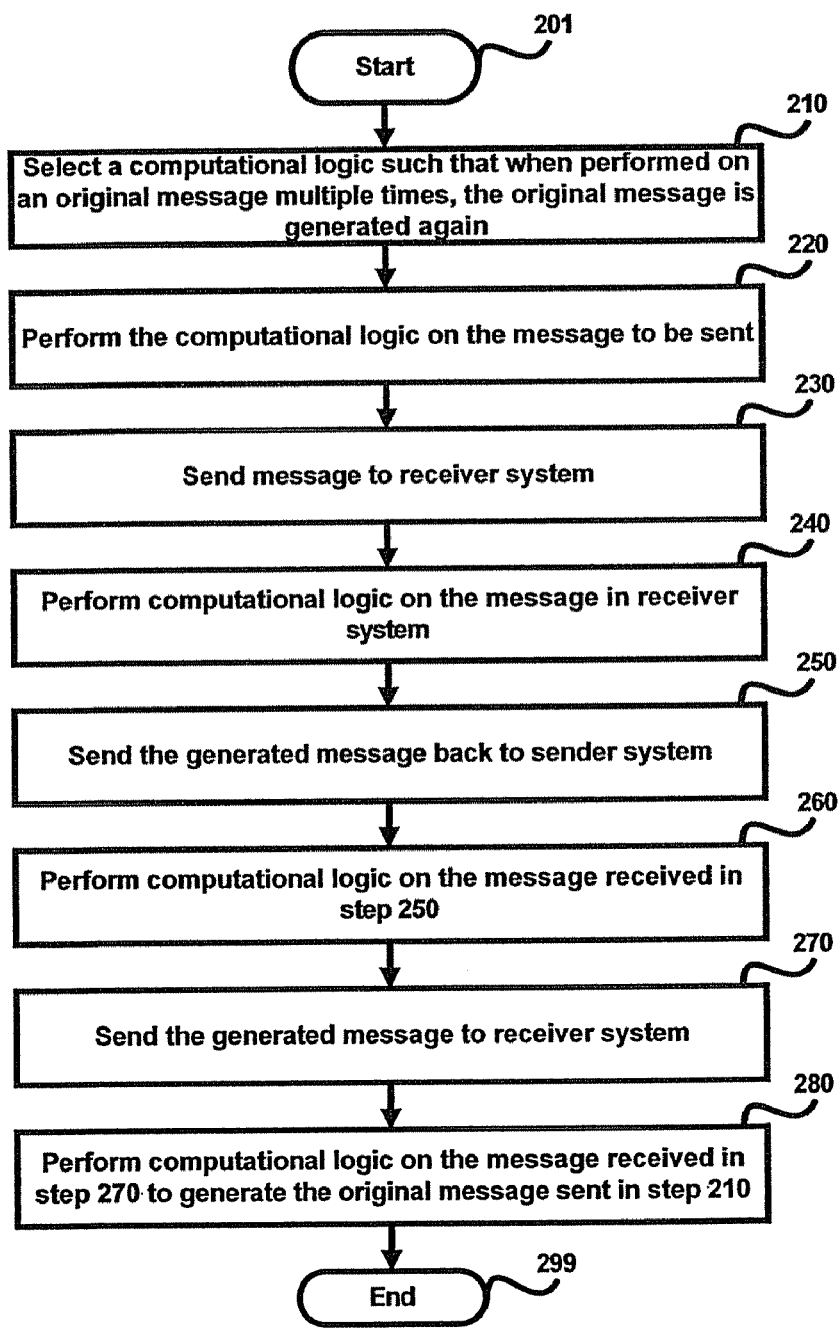
FIG. 2 is a flow chart illustrating a method to send messages securely according to an aspect of the present invention.

FIG. 2 is a flow chart illustrating the manner in which sender system 110 may send a message ("original message") securely to receiver system 170. The method is described with reference to FIG. 1 for illustration. However, the method may be used in other environments as well. The method begins in step 201 and the control immediately passes over to step 210.

In step 210, a computational logic may be selected such that the original message will be generated when the computational logic is performed on the original message twice using the same operand. In addition, the computational logic may be required to be both associative (i.e., (A OP B) OP C=A OP (B OP C)) as well as commutative (i.e., A OP B=B OP A), wherein OP represents a computational logic.

In an embodiment, exclusive OR (XOR) operation may be selected as the computational logic because applying XOR with the same operand twice causes the original message to be generated and XOR operation is both associative and commutative. However, more complex expressions (potentially containing many equations) may be used for a computational logic.

In step 220, sender system 110 may perform the computational logic on the message ("original message") which needs to be sent to receiver system 170. The message thus generated may be referred to as a second message. In step 230, sender system 110 may send the second message to receiver system 170.

In step 240, receiver system 170 may receive the second message and perform a computational logic on the second message to generate a third message. The computational logic in receiver system 170 may need to satisfy the criteria noted with reference to step 210 above. While the embodiments are described as using the same computation logic in both sender system 110 and receiver system 170, different computational logics may be implemented in the two systems to the extent the selection criteria of step 210 is satisfied. For example, receiver system 170 may use XNOR operation.

In step 250, receiver system 170 may send the third message to sender system 110. In step 260, sender system 110 may perform the computational logic (of step 210) on the third message (received in step 250) to generate a fourth message.

In step 270, sender system 110 may send the fourth message to receiver system 170. In step 280, receiver system 170 may perform computational logic (of step 240) on the fourth message (received in step 260) to generate a fifth message. The fifth message would be identical to the original message sent by sender system 110 in step 210 as described in sections below. However, several embodiments may be implemented which take into account additional security considerations. An example embodiment taking some considerations into account is described first.

4. Implementation

In one embodiment, the computational logic is implemented to perform an XOR operation of an original message with a random message (RM-A) having the same length/size as the original message (on a bit by bit basis). The random message may be generated in a known way. The resulting "second message" is sent to receiver system 170.

The receiver system 170 may perform a XOR operation of the second message with another random message (RM-B) of same size to generate a third message. The third message is sent to sender system 110.

Sender system 110 again performs an XOR operation of the third message and RM-A as an operand to generate a fourth message. Due to the associate and commutative properties of XOR operation, the fourth message equals the original message XORed with RM-B. The fourth message is sent to receiver system 170.

Receiver system 170 may perform an XOR operation of the fourth message and RM-B to generate a fifth message. Due to the associative and commutative properties of XOR operation, the fifth message is identical to the original message.

To further enhance the security while sending messages, technologies such as digital certificates and public key infrastructure may be used. Some of the technologies are described in a book entitled, "Applied Cryptography", Second Edition, ISBN Number: 0-471-11709-9, which is incorporated into the present application by reference in its entirety herewith.

In an embodiment, sender system 110 may further encrypt the first message with a public key of receiver system 170. Thus, a original message may be encrypted twice, once with random message and then with the public key of receiver system 170.

Sender system 110 may also attach a digital signature to the message being sent for more security. A one way hashing algorithm (on the output generated by using the public key) may first be applied to generate a message digest, and the message digest may be encrypted using the private key of sender system 110 to generate a digital signature. The digital signature may be generated in a known way. The digital signature may be sent along with the output generated by using the public key.

Receiver system 170 may verify the digital signature attached to the second message in a known way, confirming that the underlying message has not been modified. The public key of sender system 110 may be used in verifying the digital signature, and may be performed in a known way.

Receiver system 170 may use its own private key to decrypt the message (generated at sender system 110 using the public key of receiver system 170) received along with the digital signature. The decryption may be performed in a known way. Receiver system 170 may then apply a computational logic (similar to that applied by sender system 110) to the decrypted message.

The message thus generated may again be encrypted (using the public key of sender system 110) and sent along with a digital signature (generated using the private key of receiver system 170). Thus, sender system 110 and receiver system 170 may exchange the messages generated according to the flow-chart of FIG. 2 using key pairs and digital signatures as described above.

Once the receiver system 110 receives a message a final (second) time and applies the computational logic, the resulting message may equal to original message sought to be sent from sender system 110 to receiver system 170 as described below with reference to theoretical basis.

5. Theoretical Basis

The above approach may be mathematically illustrated as described below. The following notations are used for illustration. The original message sent by sender system 110 may be represented by 'OM', the random message generated by sender system 110 may be represented as 'RM-A', the random message generated by receiver system 170 may be represented as 'RM-B'.

Encryption may be represented by the alphabet 'E'. Thus, a message encrypted using the private key of sender system 110 is represented as 'EA (M)', a message encrypted using the public key of sender system 110 is represented as 'EA' (M)'. Similarly, a message encrypted using the private key of receiver system 170 is represented as 'EB (M)' and a message encrypted using the private key of receiver system 170 is represented as 'EB'(M)'.

Decryption may be represented by the alphabet 'D'. Thus, a message decrypted using the private key of receiver system 170 is represented as 'DB(M)', a message decrypted using the public key of receiver system 170 is represented as 'DB'(M)'. Similarly, a message decrypted using the private key of sender system 110 is represented as 'DA(M)' and a message decrypted using the private key of sender system 110 is represented as 'DA'(M)'.

The XOR operation between two messages on a bit by bit basis may be represented as 'X(M,R)', where 'M' and 'R' represent different two messages. Thus, the second message, i.e., the message sent by sender system 110 to receiver system 170 may be represented mathematically as follows.

$$\text{Second message} = EB'(X(OM, RM\text{-}A)) + \text{digital signature} \quad \text{Equation (1)}$$

Receiver system 170 receives the second message and performs various operations on the second message as described in the earlier section to generate the third message. The third message may be represented as follows:

$$\text{Third message} = EA'(X(DB(EB'(X(OM, RM\text{-}A))), RM\text{-}B)) + \text{digital signature} \quad \text{Equation (2)}$$

Sender system 110 performs various operations on the third message as described in the earlier section to generate the fourth message. The fourth message may be represented as follows:

$$\text{Fourth message} = EB'(X(DA(EA'(X(DB(EB'(X(OM, RM\text{-}A)), RM\text{-}B)), RM\text{-}A)) + \text{digital signature} \quad \text{Equation (3)}$$

Receiver system 170 decrypts the fourth message to generate the fifth message. The fifth message may be represented as follows:

$$\text{Fifth message} = X(DB(EB'(X(DA(EA'(X(DB(EB'(X(OM, RM\text{-}A))), RM\text{-}B))), RM\text{-}A))), RM\text{-}B) \quad \text{Equation (4)}$$

As described earlier, the fifth message may correspond to the original message. The manner in which the fifth message corresponds to the original message may be illustrated by simplifying equation (4).

The expression "DB(EB'(X(OM, RM-A)))" contained in equation (4) may equal "X(OM, RM-A)" since "X(OM, RM-A)" has been encrypted using the public key of receiver system 170 and then decrypted using the private key of receiver system 170. Thus equation (4) may be simplified as:

$$\text{Fifth message} = X(DB(EB'(X(DA(EA'(X(X(OM, RM\text{-}A), RM\text{-}B))), RM\text{-}A))), RM\text{-}B) \quad \text{Equation (5)}$$

Similarly expression "DA(EA'(X(X(OM, RM-A),RM-B)))" may equal X(X(OM, RM-A),RM-B). Thus equation (5) may be further simplified as:

$$\text{Fifth message} = X(DB(EB'(X(X(OM, RM\text{-}A), RM\text{-}B), RM\text{-}A))), RM\text{-}B) \quad \text{Equation (6)}$$

Again, the expression "DB(EB'(X(X(OM, RM-A),RM-B),RM-A)))" equals "X (X(X(OM, RM-A),RM-B),RM-A)". Thus, equation (6) reduces to:

$$\text{Fifth message} = X(X(X(X(OM, RM\text{-}A), RM\text{-}B), RM\text{-}A), RM\text{-}B) \quad \text{Equation (7)}$$

As is well known, the XOR operation is associative as well as commutative. That is, X(X(P, Q), R) equals X(X(P, R), Q), and also equals X(X(Q, P), R) etc. Therefore, equation (7) may be re-arranged as follows:

$$\text{Fifth message} = X(X(X(X(RM\text{-}A, RM\text{-}A), RM\text{-}B), RM\text{-}B), OM) \quad \text{Equation (8)}$$

As is well known, X(P, P)=0, thus equation (8) may be further simplified as follows:

$$\text{Fifth message} = X(X(X(0, RM\text{-}B), RM\text{-}B), OM) \quad \text{Equation (9)}$$

Again, as is well known, X(0, P)=P, thus equation (9) may be further simplified as follows:

$$\text{Fifth message} = X(X(RM\text{-}B, RM\text{-}B), OM) \quad \text{Equation (10)}$$

Since X(P, P)=0 and X(0, P)=P, equation (10) may be further simplified as follows:

$$\text{Fifth message} = OM \quad \text{Equation (11)}$$

Thus, from equation (11) it may be noted that the fifth message generated by receiver system 170 equals the original message (OM) sent by sender system 110.

The operation of sender system 110 and receiver system 170 in sending and receiving message in accordance with equations 1 through 11 noted above, is summarized below in further detail with reference to the flow-charts of FIGS. 3-6.

6. Sender System Sending First Time

Figure 3:
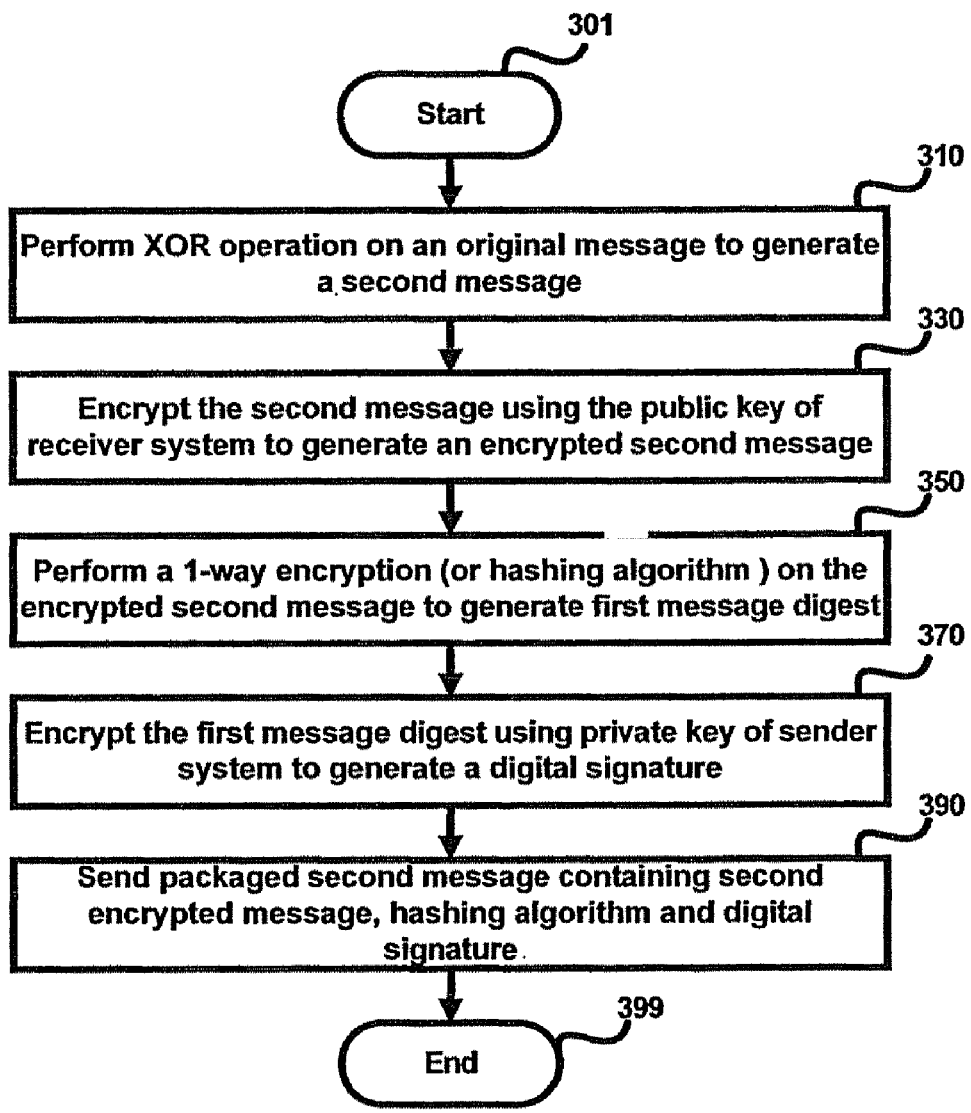
FIG. 3 is a flow chart illustrating the manner in which a sender system sends a second message to a receiver system.

FIG. 3 is a flow chart illustrating the manner in which sender system 110 sends an original message to receiver system 170 in a first of multiple iterations (times). The method begins in step 301 and control immediately passes to step 310.

In step 310, sender system 110 performs an XOR operation of the original message and the random message (RM-A) received as inputs, on a bit by bit basis to generate a second message. The random message may be generated in a known way. In step 330, sender system 110 may encrypt the second message using the public key of receiver system 170 to generate an encrypted second message. The encryption may be performed in a known way.

In step 350, sender system 110 may perform a one-way encryption (using one of several known hashing algorithms) to generate a first message digest. In step 370, the first message digest may be encrypted with the private key of sender system 110 to generate a digital signature. Steps 350 and 370 may be performed in a known way.

In step 390, sender system 110 may send a packaged second message to receiver system 170. The packaged second message may contain the encrypted second message, the hashing algorithm used (or an identifier thereof), and the digital signature. The manner in which receiver system 170 processes the packaged second message is described below.

7. Receiver System Processing First Time

Figure 4:
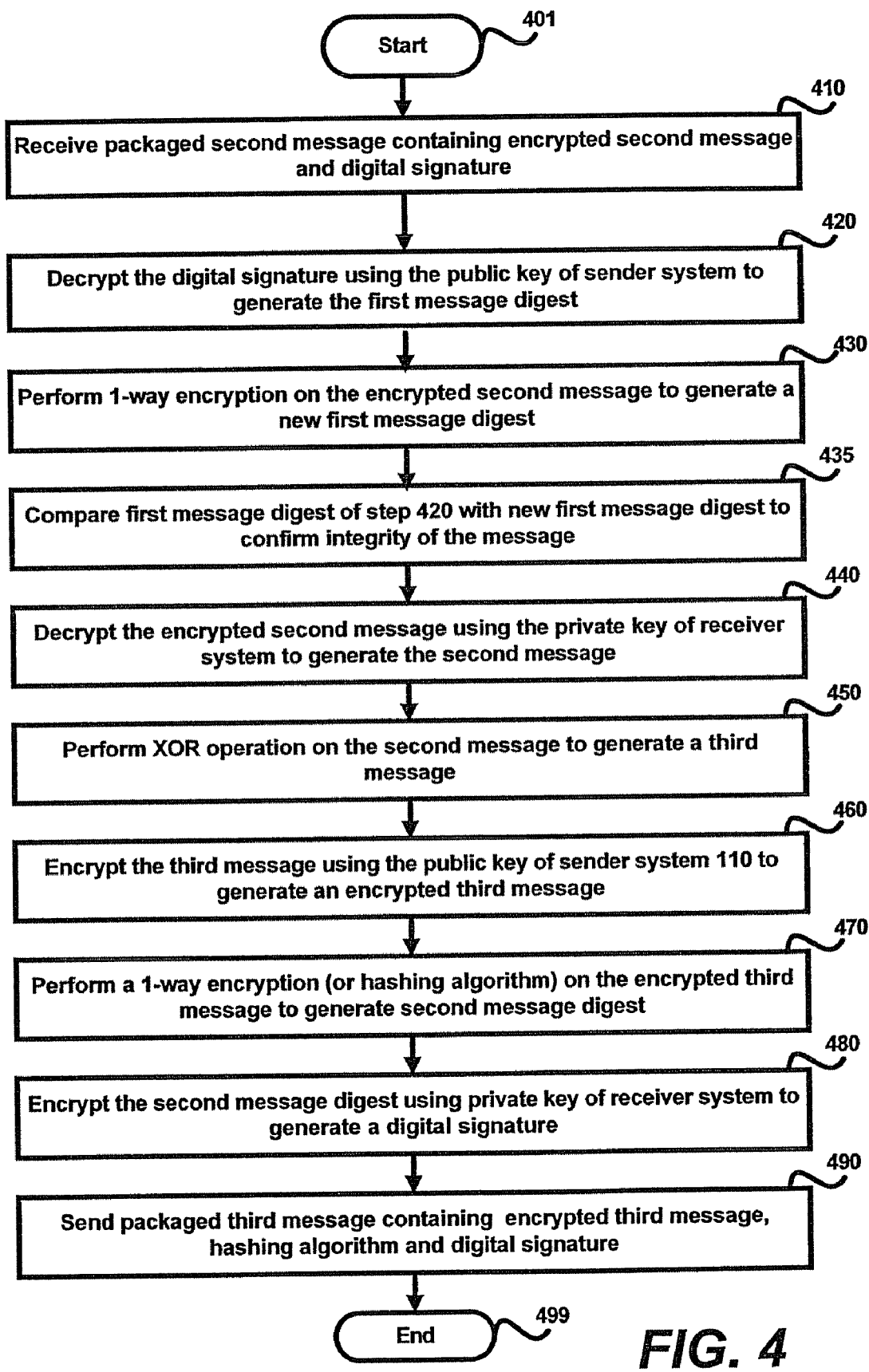
FIG. 4 is a flow chart illustrating the manner in which a receiver system sends a third message to a sender system.

FIG. 4 is a flow chart illustrating the operations performed on the packaged second message by receiver system 170. The method begins in step 401, in which control passes immediately to step 410.

In step 410, receiver system 170 may receive the packaged second message containing the encrypted second message and digital signature. In step 420, receiver system 170 may decrypt the digital signature using the public key of sender system 110 to generate the first message digest. In step 430, receiver system 170 may perform a one way encryption on the encrypted second message to generate a new first message digest. The algorithm used for one-way encryption may be specified in the packaged second message or be pre-determined.

In step 435, receiver system 170 may compare the first message digest (generated in step 420) with the new first message digest (generated in step 430). If the first message digest equals the new first message digest, it may be concluded that the packaged second message has not been modified by an unknown third party and that sender system 110 has sent the message.

In step 440, receiver system 170 may decrypt the encrypted second message using the private key of receiver system 170 to generate the second message. In step 450, receiver system 170 may perform an XOR operation between the second message and a random message (RM-B) to generate a third message.

In step 460, receiver system 170 may encrypt the third message with the public key of sender system 110 to generate a encrypted third message. In step 470, receiver system 170 performs a one-way encryption on the encrypted third message to generate a second message digest. In step 480, receiver system 170 may encrypt the second message digest with the private key to generate a digital signature.

In step 490, receiver system 170 may send a packaged third message to sender system 110. The packaged third message may contain the encrypted third message, identity of the hashing algorithm and the digital signature. The manner in which sender system 110 processes the packaged third message is described below.

8. Sender System Processing Second Time

Figure 5:
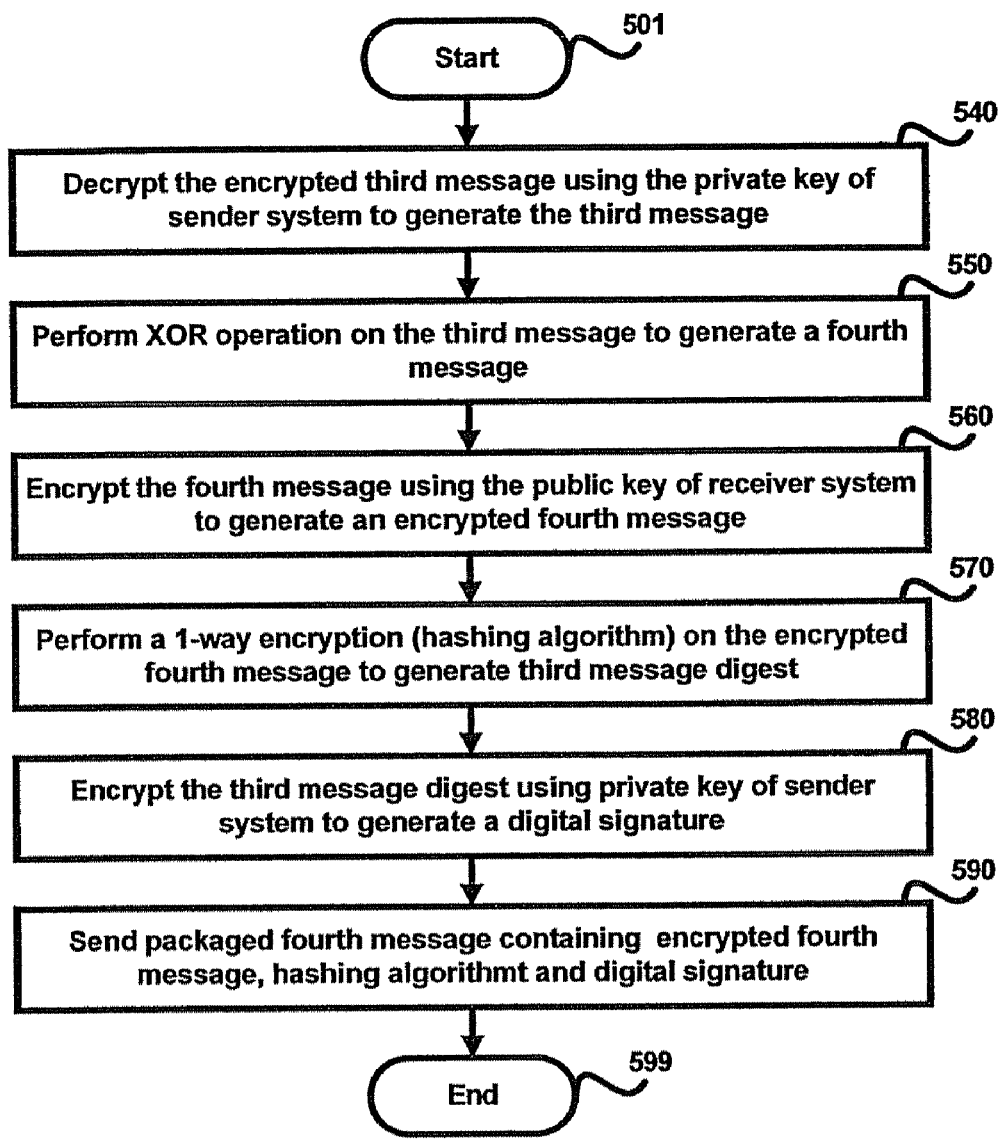
FIG. 5 is a flow chart illustrating the manner in which a sender system sends a fourth message to a receiver system.

FIG. 5 is a flow chart illustrating the operations performed on the packaged third message by sender system 110. Sender system 110 may verify if the packaged third message has been sent by receiver system 170 in a similar manner as described in the above section with reference in step 410 of FIG. 4. Similarly, sender system 110 may also confirm the integrity of the encrypted third message as described in steps 420, 430 and 435 of FIG. 4. Control then passes to step 540.

In step 540, sender system 110 may decrypt the encrypted third message using the private key to generate the third message. In step 550, sender system 110 may perform an XOR operation between the third message and RM-A to generate a fourth message. In step 560, sender system 110 encrypts the fourth message with the public key of receiver system 170 to generate an encrypted fourth message.

In step 570, sender system 110 performs a one-way encryption on the encrypted fourth message to generate a third message digest. In step 580, sender system 110 encrypts the third message digest with the private key to generate a digital signature.

In step 590, sender system 110 sends a packaged fourth message to receiver system 170. The packaged fourth message may contain the encrypted fourth message, hashing algorithm and the digital signature. The manner in which receiver system 170 processes the packaged fourth message to recover the original message is described below with reference to FIG. 6.

9. Receiver System Processing Second Time

Figure 6:
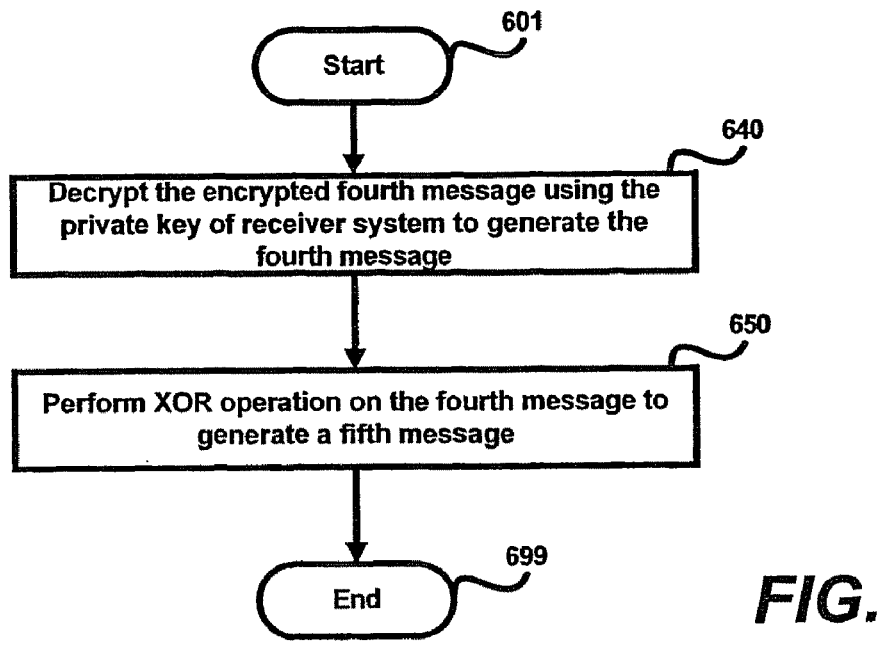
FIG. 6 is a flow chart illustrating the manner in which a receiver system recovers an original message.

FIG. 6 is a flow chart illustrating the operations performed on the fourth message by receiver system 170. Receiver system 170 may confirm the integrity of the packaged fourth message in a similar manner as described in the above section with reference in step 410 of FIG. 4. Similarly, receiver system 170 may also check if the encrypted fourth message has been modified as described in steps 420, 430 and 435 of FIG. 4.

In step 640, receiver system 170 decrypts the encrypted fourth message using the corresponding private key to generate the fourth message. In step 650, receiver system 170 may perform an XOR operation between the fourth message and RM-B to generate a fifth message. Due to the associative and commutative properties of the XOR operations, the fifth message may be identical to the original message sent by sender system 110 to receiver system 170.

Thus, by using the approaches described with reference to FIGS. 3-6, sender system 110 may send a message securely to receiver system 170. The approach is now described with reference to an example message that sender system 110 needs to send to receiver system 170.

10. Example Message

It is assumed that sender system 110 sends a message ("original message") containing the bits "10110110" to receiver system 170. The manner in which sender system 110 sends the message securely is described below.

Sender system 110 first generates a random message (RM-A) whose size is as that of the original message to be sent. It is assumed that the random message equals "11010100". Sender system 110 then encrypts the original message with the random message by performing an XOR operation on the original message and the random message as illustrated below:

1 0 1 1 0 1 1 0 (Original Message)
1 1 0 1 0 1 0 0 (Random Message generated by sender system 110)
- - -
0 1 1 0 0 0 1 0 (second message)
- - -

The second message is further encrypted with the public key of receiver system 170 to generate the encrypted second message. Sender system 110 may then generate a first message digest by applying one-way algorithm (hashing algorithm) on the encrypted second message.

The first message digest may then be encrypted using the private key of sender system 110 to generate the digital signature. Sender system 110 then sends a packaged second message to receiver system 170 which contains the encrypted second message, hashing algorithm and the digital signature.

When receiver system 170 receives the packaged second message, receiver system 170 verifies if the packaged second message is sent by sender system 110 and if the second encrypted message has been modified, as described in the earlier sections.

Receiver system 170 may then decrypt the encrypted second message (using the private key of receiver system 170) to obtain the second message. Receiver system 170 may encrypt the second message with the random message by performing an XOR operation as illustrated below. It is assumed that the random message generated by receiver system 170 equals "10010101".

0 1 1 0 0 0 1 0 (second message)
1 0 0 1 0 1 0 1 (Random Message RM-B)
- - -
1 1 1 1 0 1 1 1 (Third message)
- - -

Receiver system 170 them encrypts third message with the public key of sender system 110 to generate the encrypted third message. Receiver system 170 may then generate a second message digest by applying one-way algorithm (hashing algorithm) on the encrypted third message.

The second message digest may then be encrypted using the private key of receiver system 170 to generate the digital signature. Receiver system 170 then sends a packaged third message to sender system 110 which contains the encrypted third message, hashing algorithm and the digital signature.

When sender system 110 receives the packaged third message, sender system 110 firsts verifies if the packaged third message is sent by receiver system 170 as described in the earlier sections.

Sender system 110 may then decrypt the encrypted third message (using the private key of sender system 110) to obtain the third message. Sender system 110 may encrypt the third message with RM-B by performing an XOR operation as illustrated below:

1 1 1 1 0 1 1 1 (Third message)
1 1 0 1 0 1 0 0 (random message)
- - -
0 0 1 0 0 0 1 1 (fourth message)
- - -

The fourth message is further encrypted with the public key of receiver system 170 to generate the encrypted fourth message. Sender system 110 may then generate a third message digest by applying one-way algorithm (hashing algorithm) on the third encrypted message.

The third message digest may then be encrypted using the private key of sender system 110 to generate the digital signature. Sender system 110 then sends a packaged fourth message to receiver system 170 which contains the encrypted fourth message, hashing algorithm and the digital signature.

When receiver system 170 receives the packaged fourth message, receiver system 170 may confirm that the message is in fact sent by sender system 130 and that the message has not been modified by an unknown third party using the digital signature contained in the packaged fourth message. Receiver system 170 may then decrypt the encrypted fourth message (using the private key of receiver system 170) to obtain the fourth message. Receiver system 170 may encrypt the fourth message with the random message by performing an XOR operation as illustrated below:

0 0 1 0 0 0 1 1 (fourth message)
1 0 0 1 0 1 0 1 (Random Message)
- - -

1 0 1 1 0 1 1 0 (fifth message)

- - -

It may be noted that the fifth message is identical to the original message sent by sender system 110. Thus, sender system 110 may send a message securely to receiver system 170.

11. Alternative Approach

The level of security provided by the above embodiment is sufficient for transmitting highly confidential messages, but in case if required, the technique may be further enhanced to provide a higher level of security. The manner in which the above technique may be enhanced is described below with reference to FIG. 7.

Figure 7:
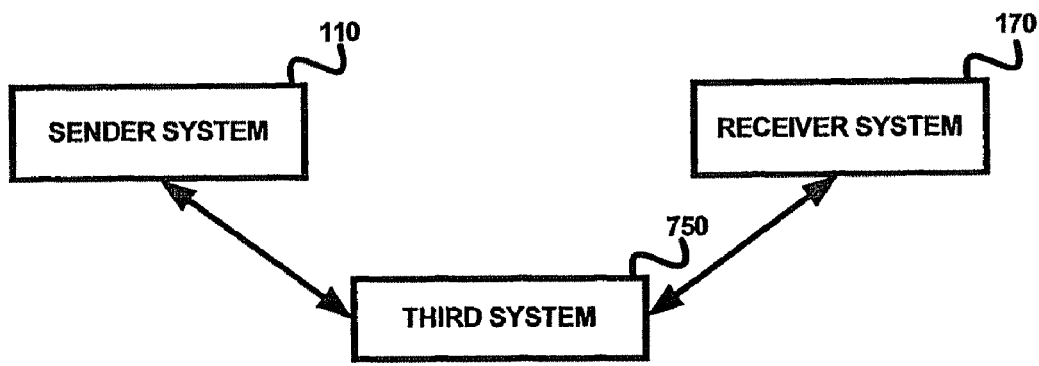
FIG. 7 is a block diagram illustrating the manner in which security can be further enhanced by using a third system between a sender system and a receiver system.

FIG. 7 is shown containing sender system 110, receiver system 170 and third system 750. Third system 750 may be used as a middle system to send messages form sender system 110 to receiver system 170. The manner in which the above approach may be used along with third system 750 is described below. It is assumed that third system 750 may generate a random number (RM-C) whose size equals the original message sent by sender system 110.

It is assumed that sender system 110 is required to send a message ("original message") to receiver system 170. First sender system 110 encrypts and sends the original message to third system 750. That is, sender system 110 first performs an XOR operation between the original message and the random message to generate the second message. The second message is further encrypted using the public key of third system 750 to generate the encrypted second message. The mathematical expression for the encrypted second message is as follows:

$$\text{Encrypted second message} = EC'(X(OM, RM\text{-}A)) \qquad \text{Equation (12)}$$

Similarly, third system 750 processes the encrypted second message in the similar manner as described above to generate a encrypted third message. The encrypted third message is sent to receiver system 170. The encrypted third message may be represented mathematically as follows:

$$\text{Encrypted third message} = EB'(X(DC(EC'(X(OM, RM\text{-}A))), RM\text{-}C)) \qquad \text{Equation (13)}$$

Similarly, receiver system 170 generates a encrypted fourth message (as described earlier)and sends it to sender system 110. The encrypted fourth message may be represented as follows:

$$\text{Encrypted fourth message} = EA'(X(DB(EB'(X(DC(EC'(X(OM, RM\text{-}A))), RM\text{-}C))), RM\text{-}B)) \qquad \text{Equation (14)}$$

Sender system 110 generates an encrypted fifth message and sends it to third system 750. The encrypted fifth message may be represented as follows:

$$\text{Encrypted fifth message} = EC'(X(DA(EA'(X(DB(EB'(X(DC(EC'(X(OM, RM\text{-}A))), RM\text{-}C))), RM\text{-}B))), RM\text{-}A)) \qquad \text{Equation (15)}$$

Third system 750 generates an encrypted sixth message and send it to receiver system 170. The encrypted sixth message may be represented as follows:

$$\text{Encrypted sixth message} = EB'(X(D(EC'(X(DA(EA'(X(DB(EB'(X(DC(EC'(X(OM, RM\text{-}A))), RM\text{-}C))), RM\text{-}B))), RM\text{-}A))), RM\text{-}C)) \qquad \text{Equation (16)}$$

On simplifying the above expression, it may be noted that the encrypted sixth message is equal to the original message.

An advantage of the above approach is that an intruder may require the private keys of sender system 110, receiver system 170 and third system 750 to decipher the message. In addition, a copy of all the five encrypted messages may be required which typically, is very difficult to obtain. It may be appreciated that third system 750 may not be able to decipher the message since all the keys are not available to the third system 750.

It may be noted that though the above approach has been described with reference to third system 750, the approach may also be used with several number of systems (between sender system 110 and receiver system 170). It may be noted that more systems between sender system 110 and receiver system 170 may decrease the probability of an intrude breaking into a message.

12. Software Implementation

Figure 8:
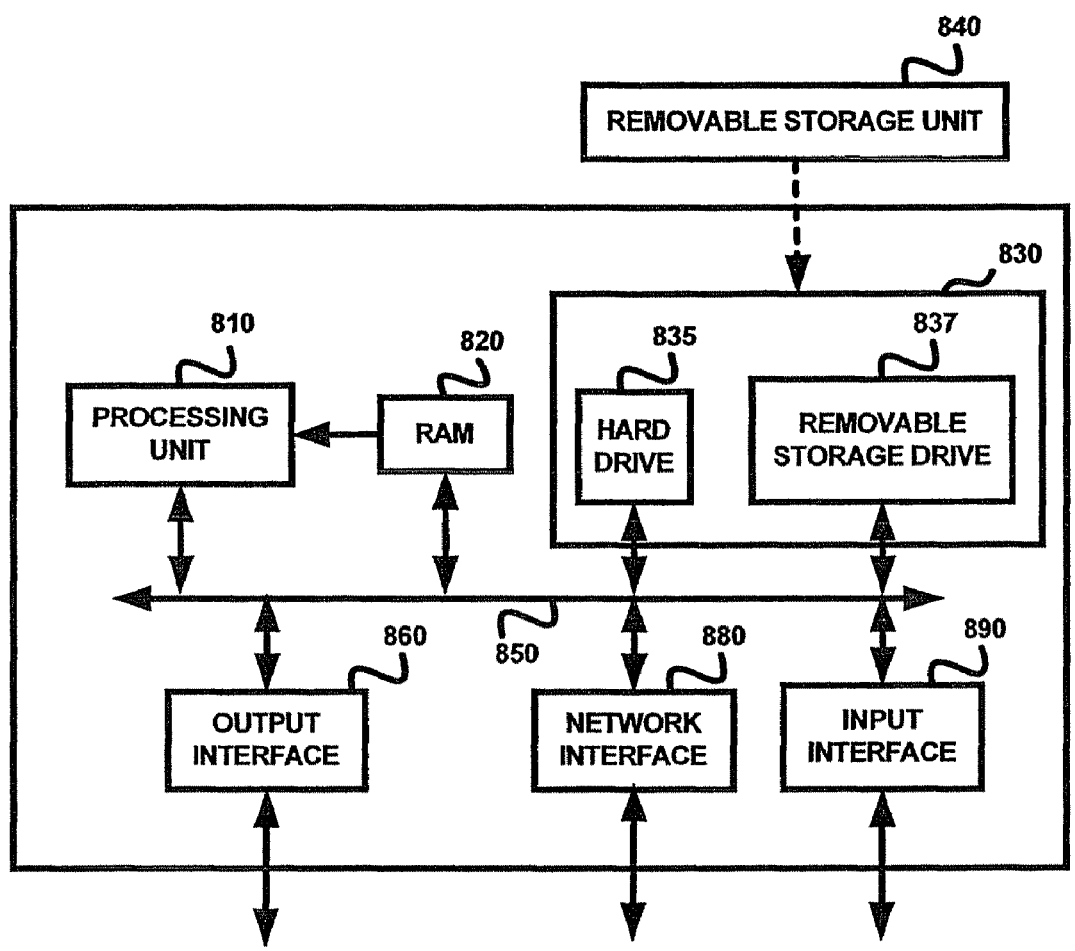
FIG. 8 is a block diagram illustrating an embodiment of the present invention implemented substantially in the form of software.

FIG. 8 is a block diagram illustrating the details of an embodiment of digital system 800, which can be used to implement sender system 110, receiver system 170. Digital system 800 is shown containing processing unit 810, random access memory (RAM) 820, storage 830, output interface 860, network interface 880 and input interface 890. Each component is described in further detail below.

Output interface 860 provides output signals (e.g., display signals to a display unit, not shown) which can form the basis for a suitable user interface for a user to interact with sender system 110. Input interface 890 (e.g., interface with a keyboard and/or mouse, not shown) enables a user to provide any necessary inputs to sender system 110.

Output interface 860 and input interface 890 can be used, for example, to enable a user to interact with sender system 110. For example, a user may provide the inputs like the destination of the message, etc., which may be required when sending the message to another system using input interface 890 and the corresponding result (like a message informing the user that the message has been sent) may be viewed on a display unit (not shown) using output interface 860.

Network interface 880 enables sender system 110 to send and receive messages on communication networks using protocols such as internet protocol (IP). Network interface 880, output interface 860 and input interface 890 can be implemented in a known way.

RAM 820 and storage (secondary memory) 830 may together be referred to as a memory. RAM 820 receives instructions and data corresponding to the message to be sent on path 850 from storage 830, and provides the instructions to processing unit 810 for execution.

Secondary memory 830 may contain units such as hard drive 835 and removable storage drive 837. Secondary storage 830 may store the software instructions and data, which enable sender system 110 to provide several features in accordance with the present invention.

Some or all of the data and instructions may be provided on removable storage unit 840, and the data and instructions may be read and provided by removable storage drive 837 to processing unit 810. Floppy drive, magnetic tape drive, CD-ROM drive, DVD Drive, Flash memory, removable memory chip (PCMCIA Card, EPROM) are examples of such removable storage drive 837.

Processing unit 810 may contain one or more processors. In general processing unit 810 reads sequences of instructions from various types of memory medium (including RAM 820, storage 830 and removable storage unit 840), and executes the instructions to provide several features of the present invention as described above.

An embodiment of the present invention is implemented using software running (that is, executing) in digital system 800. In this document, the term "computer program product" is used to generally refer to removable storage unit or hard disk installed in hard drive. These computer program products are means for providing software to digital system 800. These computer program products generally contain computer readable medium providing software to digital system 800. The computer readable medium can be provided external to digital system 800.

13. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for communicating messages, said method comprising:

receiving in a first packaged message, by a receiver from a sender, an encrypted second message and a first digital signature, wherein the encrypted second message had been generated by said sender by encryption of a second message using a public key of the receiver, wherein the second message had been generated by said sender from an original message via performance of a first computational logic of said original message and a first random message to generate said second message, and wherein the first random message consists of a first random number, and wherein the first digital signature had been generated by the sender by via encryption of a first message digest using a private key of the sender;

decrypting, by the receiver, the encrypted second message received from the sender, using a private key of the receiver to generate the second message;

performing, by said receiver, a second computational logic of said decrypted encrypted second message and a second random message to generate a third message, wherein said second random message differs from said first random message, and wherein the second random message consists of a second random number;

encrypting, by the receiver, the third message using a public key of the sender to generate an encrypted third message;

generating, by the receiver, a second message digest by performing a one way encryption of the encrypted third message through use of a hashing algorithm;

encrypting, by the receiver, the second message digest to generate a second digital signature using the private key of the receiver to generate a digital signature;

sending in a second packaged message, by the receiver, the encrypted third message and the second digital signature to the sender, resulting in receipt of the encrypted third message and the second digital signature by the sender.

2. The method of claim 1, wherein said receiving the encrypted second message and the first digital signature further comprises receiving the hashing algorithm in the first packaged message.

3. The method of claim 1, wherein the first message digest had been generated by the sender via performance of a one way encryption of the encrypted second message through use of the hashing algorithm.

4. The method of claim 1, wherein the method further comprises:

receiving, by said receiver from the sender, an encrypted fourth message and a third digital signature, wherein the encrypted fourth message had been generated by said sender by encryption of a fourth message using the public key of the receiver, wherein the fourth message had been generated by the sender, after the sender decrypted the encrypted third message to generate the third message, via performance of said first computational logic of said third message and said first random message to generate said fourth message, wherein the third digital signature had been generated by the sender by via encryption of a third message digest using the private key of the sender, and wherein the third message digest had been generated by the sender via performance of a one way encryption of the encrypted fourth message through use of the hashing algorithm;

decrypting, by the receiver, the encrypted fourth message received from the sender, using the private key of the receiver to generate the fourth message; and performing, by said receiver, said second computational logic of said decrypted encrypted fourth message and said second random message on a bit by bit basis to generate a fifth message that is identical to said original message.

5. The method of claim 1, wherein said first and second computational logic each independently comprise a logic operation selected from the group consisting a XOR operation and a XNOR operation.

6. The method of claim 1, wherein said first computational logic and said second computational logic are a same computational logic.

7. The method of claim 1, wherein said first computational logic differs from said second computational logic.

8. The method of claim 1, wherein said first and second computational logic are each associative and commutative.

9. The method of claim 1, wherein said sending the encrypted third message and the second digital signature further comprises sending, in the second packaged message, an identity of the hashing algorithm.

10. A computer program product for use with a digital system, said computer program product comprising a computer readable storage device having computer readable program code embodied therein, said computer readable program code containing instructions that when executed by a processor of said digital system implement a method for communicating messages, said method comprising:

receiving in a first packaged message, by a receiver from a sender, an encrypted second message and a first digital signature, wherein the encrypted second message had been generated by said sender by encryption of a second message using a public key of the receiver, wherein the second message had been generated by said sender from an original message via performance of a first computational logic of said original message and a first random message to generate said second message, and wherein the first random message consists of a first random number, and wherein the first digital signature had been generated by the sender by via encryption of a first message digest using a private key of the sender;

decrypting, by the receiver, the encrypted second message received from the sender, using a private key of the receiver to generate the second message;

performing, by said receiver, a second computational logic of said decrypted encrypted second message and a second random message to generate a third message, wherein said second random message differs from said first random message, and wherein the second random message consists of a second random number;

encrypting, by the receiver, the third message using a public key of the sender to generate an encrypted third message;

generating, by the receiver, a second message digest by performing a one way encryption of the encrypted third message through use of a hashing algorithm;

encrypting, by the receiver, the second message digest to generate a second digital signature using the private key of the receiver to generate a digital signature;

sending in a second packaged message, by the receiver, the encrypted third message and the second digital signature to the sender, resulting in receipt of the encrypted third message and the second digital signature by the sender.

11. The computer program product of claim 10, wherein said receiving the encrypted second message and the first digital signature further comprises receiving the hashing algorithm in the first packaged message.

12. The computer program product of claim 10, wherein the first message digest had been generated by the sender via performance of a one way encryption of the encrypted second message through use of the hashing algorithm.

13. The computer program product of claim 10, wherein the method further comprises:

receiving, by said receiver from the sender, an encrypted fourth message and a third digital signature, wherein the encrypted fourth message had been generated by said sender by encryption of a fourth message using the public key of the receiver, wherein the fourth message had been generated by the sender, after the sender decrypted the encrypted third message to generate the third message, via performance of said first computational logic of said third message and said first random message to generate said fourth message, wherein the third digital signature had been generated by the sender by via encryption of a third message digest using the private key of the sender, and wherein the third message digest had been generated by the sender via performance of a one way encryption of the encrypted fourth message through use of the hashing algorithm;

decrypting, by the receiver, the encrypted fourth message received from the sender, using the private key of the receiver to generate the fourth message; and performing, by said receiver, said second computational logic of said decrypted encrypted fourth message and said second random message on a bit by bit basis to generate a fifth message that is identical to said original message.

14. The computer program product of claim 10, wherein said first and second computational logic each independently comprise a logic operation selected from the group consisting a XOR operation and a XNOR operation.

15. The computer program product of claim 10, wherein said first computational logic and said second computational logic are a same computational logic.

16. The computer program product of claim 10, wherein said first computational logic differs from said second computational logic.

17. The computer program product of claim 10, wherein said first and second computational logic are each associative and commutative.

18. The computer program product of claim 10, wherein said sending the encrypted third message and the second digital signature further comprises sending, in the second packaged message, an identity of the hashing algorithm.

19. A digital system comprising a processor and a computer readable memory unit coupled to the processor, said memory unit containing program code configured to be executed by the processor to implement a method for communicating messages, said method comprising:

receiving in a first packaged message, by a receiver from a sender, an encrypted second message and a first digital signature, wherein the encrypted second message had been generated by said sender by encryption of a second message using a public key of the receiver, wherein the second message had been generated by said sender from an original message via performance of a first computational logic of said original message and a first random message to generate said second message, and wherein the first random message consists of a first random number, and wherein the first digital signature had been generated by the sender by via encryption of a first message digest using a private key of the sender;

decrypting, by the receiver, the encrypted second message received from the sender, using a private key of the receiver to generate the second message;

performing, by said receiver, a second computational logic of said decrypted encrypted second message and a second random message to generate a third message, wherein said second random message differs from said first random message, and wherein the second random message consists of a second random number;

encrypting, by the receiver, the third message using a public key of the sender to generate an encrypted third message;

generating, by the receiver, a second message digest by performing a one way encryption of the encrypted third message through use of a hashing algorithm;

encrypting, by the receiver, the second message digest to generate a second digital signature using the private key of the receiver to generate a digital signature;

sending in a second packaged message, by the receiver, the encrypted third message and the second digital signature to the sender, resulting in receipt of the encrypted third message and the second digital signature by the sender.

20. The digital system product of claim 19, wherein the method further comprises:

receiving, by said receiver from the sender, an encrypted fourth message and a third digital signature, wherein the encrypted fourth message had been generated by said sender by encryption of a fourth message using the public key of the receiver, wherein the fourth message had been generated by the sender, after the sender decrypted the encrypted third message to generate the third message, via performance of said first computational logic of said third message and said first random message to generate said fourth message, wherein the third digital signature had been generated by the sender by via encryption of a third message digest using the private key of the sender, and wherein the third message digest had been generated by the sender via performance of a one way encryption of the encrypted fourth message through use of the hashing algorithm;

decrypting, by the receiver, the encrypted fourth message received from the sender, using the private key of the receiver to generate the fourth message; and performing, by said receiver, said second computational logic of said decrypted encrypted fourth message and said second random message on a bit by bit basis to generate a fifth message that is identical to said original message.

* * * * *